(12) United States Patent
Tix et al.

(10) Patent No.: US 9,156,053 B2
(45) Date of Patent: Oct. 13, 2015

(54) MELTER

(71) Applicant: Graco Minnesota Inc., Minneapolis, MN (US)

(72) Inventors: Joseph E. Tix, Hastings, MN (US); Paul R. Quam, Brooklyn Center, MN (US); Daniel P. Ross, Maplewood, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 149 days.

(21) Appl. No.: 13/660,421

(22) Filed: Oct. 25, 2012

(65) Prior Publication Data

US 2013/0105005 A1 May 2, 2013

Related U.S. Application Data (60) Provisional application No. 61/556,558, filed on Nov. 7, 2011, provisional application No. 61/552,249, filed on Oct. 27, 2011, provisional application No. 61/552,255, filed on Oct. 27, 2011.

(51) Int. Cl.
*B05B 15/06* (2006.01)
*B05C 11/10* (2006.01)
*B05B 7/02* (2006.01)
(Continued)

(52) U.S. Cl.
CPC ............... *B05B 15/065* (2013.01); *B05B 7/02* (2013.01); *B05C 11/10* (2013.01); *B05C 11/1042* (2013.01); *B29B 13/022* (2013.01); *B05C 5/02* (2013.01); *Y10T 29/49826* (2015.01); *Y10T 137/6416* (2015.04)

(58) Field of Classification Search
CPC ...... B05C 11/10; B05C 11/1042; B05C 5/02; B05B 7/02
USPC .................... 222/1, 64, 146.2, 146.5
See application file for complete search history.

(56) References Cited

U.S. PATENT DOCUMENTS

| 235,101 A | 12/1880 | Ryan |
| 1,101,506 A | 6/1914 | Bradford |
| 1,352,102 A | 9/1920 | Tatro |

(Continued)

FOREIGN PATENT DOCUMENTS

| EP | 0333903 A1 | 9/1989 |
| EP | 0342254 A1 | 11/1989 |

(Continued)

OTHER PUBLICATIONS

International Preliminary Report on Patentability dated May 8, 2014, for PCT/US2012/061964.

(Continued)

*Primary Examiner* — Paul R Durand
*Assistant Examiner* — Vishal Pancholi
(74) *Attorney, Agent, or Firm* — Kinney & Lange, P.A.

(57) ABSTRACT

A melt system capable of heating hot melt pellets into a liquid includes a melter including a body, a chamber, a collector, channels, and a heater. The thermally conductive body forms an interior with a surface area. The chamber is at an upper end of the body for receiving the pellets. The collector is within the body and located below the chamber for receiving the liquid from the melted pellets. The channels extend between the chamber and the collector to increase the surface area of the interior, and the walls of the channels form heat exchange surfaces. The heater is for transferring heat to the body.

22 Claims, 8 Drawing Sheets

(51) Int. Cl.
  *B29B 13/02* (2006.01)
  *B05C 5/02* (2006.01)

(56) References Cited

U.S. PATENT DOCUMENTS

| | | | |
|---|---|---|---|
| 1,442,371 A | 1/1923 | Tulloch | |
| 1,468,226 A | 9/1923 | Colburn et al. | |
| 2,009,606 A | 7/1935 | Diffenderfer | |
| 2,123,358 A | 7/1938 | Grutzner | |
| 2,339,741 A | 1/1944 | Cartwright | |
| 2,394,487 A | 2/1946 | Rotter et al. | |
| 2,524,820 A | 10/1950 | Miles | |
| 2,631,892 A | 3/1953 | Czarnecki, Jr. et al. | |
| 2,637,194 A | 5/1953 | Wahlin | |
| 2,639,194 A | 5/1953 | Wahlin | |
| 2,664,312 A | 12/1953 | Czarnecki, Jr. et al. | |
| 2,705,663 A | 4/1955 | Gilbreath | |
| 2,775,094 A | 12/1956 | Buckland et al. | |
| 2,791,451 A | 5/1957 | Rostan | |
| 2,812,063 A | 11/1957 | Pratt | |
| 2,840,989 A | 7/1958 | Macaulay | |
| 2,858,851 A | 11/1958 | Holl | |
| 2,875,782 A | 3/1959 | Lee | |
| 2,919,726 A | 1/1960 | Zimmermann et al. | |
| 2,967,112 A | 1/1961 | Kay et al. | |
| 2,994,344 A | 8/1961 | Kerley | |
| 2,998,828 A | 9/1961 | Hare | |
| 3,012,900 A | 12/1961 | Kleinmann et al. | |
| 3,065,918 A | 11/1962 | Hostetter | |
| 3,156,452 A | 11/1964 | Touzalin et al. | |
| 3,317,141 A | 5/1967 | Mann | |
| 3,347,205 A | 10/1967 | Dobbyn | |
| 3,363,806 A | 1/1968 | Blakeslee et al. | |
| 3,408,876 A | 11/1968 | Andrews | |
| 3,457,957 A | 7/1969 | Mueller | |
| 3,507,686 A | 4/1970 | Hagenback | |
| 3,530,893 A | 9/1970 | Masuda | |
| 3,558,052 A | 1/1971 | Dunn | |
| 3,630,484 A | 12/1971 | Taylor | |
| 3,678,959 A | 7/1972 | Liposky | |
| 3,684,253 A | 8/1972 | Bevan | |
| 3,708,118 A | 1/1973 | Keur | |
| 3,747,899 A | 7/1973 | Latinen et al. | |
| 3,752,400 A | 8/1973 | Calder | |
| 3,763,891 A | 10/1973 | Stiltner | |
| 3,789,954 A | 2/1974 | Raleigh | |
| 3,805,833 A | 4/1974 | Teed | |
| 3,856,273 A | 12/1974 | Born | |
| 3,889,881 A | 6/1975 | Cunningham et al. | |
| 3,937,923 A | 2/1976 | Smith | |
| 3,964,645 A * | 6/1976 | Scholl | 222/146.5 |
| 4,018,143 A | 4/1977 | Dice, Jr. et al. | |
| 4,144,012 A | 3/1979 | Pinkley | |
| 4,146,179 A | 3/1979 | Egli et al. | |
| 4,178,246 A | 12/1979 | Klein | |
| 4,224,958 A | 9/1980 | Kaplan et al. | |
| 4,260,183 A | 4/1981 | Krupp | |
| 4,264,282 A | 4/1981 | Crago | |
| 4,308,447 A | 12/1981 | Notzold et al. | |
| 4,325,419 A | 4/1982 | Gubitose | |
| 4,334,637 A | 6/1982 | Baker et al. | |
| 4,395,968 A | 8/1983 | Wahnschaff et al. | |
| 4,505,669 A | 3/1985 | Rogers | |
| 4,545,504 A | 10/1985 | Fabel et al. | |
| 4,582,254 A | 4/1986 | Rotolico et al. | |
| 4,598,841 A | 7/1986 | Smiles | |
| 4,613,078 A | 9/1986 | Marshall | |
| 4,613,079 A | 9/1986 | Mains | |
| 4,641,764 A | 2/1987 | Faulkner, III | |
| 4,643,224 A | 2/1987 | Rung et al. | |
| 4,655,398 A | 4/1987 | Liggett | |
| 4,667,884 A | 5/1987 | Braziel | |
| 4,771,920 A | 9/1988 | Boccagno et al. | |
| 4,790,455 A | 12/1988 | Dieringer et al. | |
| 4,791,961 A | 12/1988 | Nitzberg et al. | |
| 4,798,571 A | 1/1989 | Everman et al. | |
| 4,820,052 A | 4/1989 | Krysel | |
| 4,834,587 A | 5/1989 | Crawley et al. | |
| 4,903,501 A | 2/1990 | Hart | |
| 5,044,555 A | 9/1991 | Youngeberg et al. | |
| 5,052,432 A | 10/1991 | Vonalt et al. | |
| 5,071,289 A | 12/1991 | Spivak | |
| 5,160,041 A | 11/1992 | Taniguchi et al. | |
| 5,161,450 A | 11/1992 | Ishikawa | |
| 5,269,670 A | 12/1993 | Allen et al. | |
| 5,273,075 A | 12/1993 | Skaer | |
| 5,277,099 A | 1/1994 | Powers | |
| 5,318,198 A | 6/1994 | Micek et al. | |
| 5,330,106 A | 7/1994 | Braun, Jr. | |
| 5,366,353 A | 11/1994 | Hand | |
| 5,366,639 A | 11/1994 | Jones et al. | |
| 5,375,738 A | 12/1994 | Walsh et al. | |
| 5,378,089 A | 1/1995 | Law | |
| 5,399,014 A | 3/1995 | Takata et al. | |
| 5,445,195 A | 8/1995 | Kim | |
| 5,509,431 A | 4/1996 | Smith, Jr. et al. | |
| 5,520,521 A | 5/1996 | Benckert et al. | |
| 5,533,650 A | 7/1996 | Conrad et al. | |
| 5,575,941 A | 11/1996 | Johnson | |
| 5,584,666 A | 12/1996 | Kozumplik, Jr. et al. | |
| 5,598,974 A | 2/1997 | Lewis et al. | |
| 5,624,690 A | 4/1997 | Boldis et al. | |
| 5,649,813 A | 7/1997 | Able et al. | |
| 5,650,083 A | 7/1997 | Bondeson et al. | |
| 5,657,904 A * | 8/1997 | Frates et al. | 222/146.5 |
| 5,728,219 A | 3/1998 | Allen et al. | |
| 5,769,464 A | 6/1998 | DeBlasi et al. | |
| 5,791,830 A | 8/1998 | Fort et al. | |
| 5,794,847 A | 8/1998 | Stocker | |
| 5,820,022 A | 10/1998 | Fukano et al. | |
| 5,868,319 A | 2/1999 | Gilmore | |
| 5,873,528 A | 2/1999 | Lewis et al. | |
| 5,875,922 A | 3/1999 | Chastine et al. | |
| 5,924,850 A | 7/1999 | French | |
| 5,942,170 A | 8/1999 | Peitz | |
| 5,967,429 A | 10/1999 | Ulfik et al. | |
| 5,996,902 A | 12/1999 | Morimoto et al. | |
| 6,024,123 A | 2/2000 | Weissfloch et al. | |
| 6,024,481 A | 2/2000 | Hillström et al. | |
| 6,032,690 A | 3/2000 | Weissfloch et al. | |
| 6,095,803 A | 8/2000 | Slater | |
| 6,168,049 B1 | 1/2001 | Bolyard, Jr. | |
| 6,210,141 B1 | 4/2001 | Allen | |
| 6,260,583 B1 | 7/2001 | Flatt et al. | |
| 6,315,168 B1 | 11/2001 | Bolyard, Jr. et al. | |
| 6,319,996 B1 | 11/2001 | Burke et al. | |
| 6,364,520 B1 | 4/2002 | Steele | |
| 6,378,782 B1 | 4/2002 | Craine et al. | |
| 6,378,784 B1 | 4/2002 | Allen et al. | |
| 6,644,941 B1 | 11/2003 | Able et al. | |
| 6,666,258 B1 | 12/2003 | Kono | |
| 6,776,361 B1 | 8/2004 | Watanabe et al. | |
| 6,811,095 B2 | 11/2004 | Donley et al. | |
| 6,814,317 B2 | 11/2004 | Watanabe et al. | |
| 6,883,960 B2 | 4/2005 | Reeder et al. | |
| 6,962,487 B2 | 11/2005 | Caldwell | |
| 7,015,427 B1 * | 3/2006 | Jeter | 219/421 |
| RE39,399 E | 11/2006 | Allen | |
| 7,172,337 B2 | 2/2007 | Roszczenko et al. | |
| 7,182,229 B2 | 2/2007 | Gould et al. | |
| 7,270,249 B1 | 9/2007 | Burkhead | |
| 7,288,601 B2 | 10/2007 | Nogi et al. | |
| 7,296,919 B2 | 11/2007 | Petersen et al. | |
| 7,431,494 B2 | 10/2008 | Zambaux | |
| 7,575,633 B2 | 8/2009 | Romanin | |
| 7,614,529 B2 | 11/2009 | Bolyard, Jr. et al. | |
| 7,626,143 B2 | 12/2009 | Miller | |
| 7,699,243 B2 | 4/2010 | Starke | |
| 7,770,760 B2 | 8/2010 | McGuffey et al. | |
| 7,819,253 B2 | 10/2010 | Borger et al. | |
| 7,857,173 B2 | 12/2010 | Bolyard, Jr. | |
| 7,870,891 B2 | 1/2011 | Rule | |
| 7,886,935 B2 | 2/2011 | Lasko | |
| 7,905,358 B2 | 3/2011 | Backes et al. | |

(56) References Cited

U.S. PATENT DOCUMENTS

| | | |
|---|---|---|
| 8,005,417 B2 | 8/2011 | Hattori et al. |
| 8,069,653 B2 | 12/2011 | Ganzer |
| 8,079,158 B2 | 12/2011 | Ekart et al. |
| 8,118,070 B2 | 2/2012 | Smith |
| 8,152,362 B2 | 4/2012 | Uhlenkamp et al. |
| 8,225,963 B2 | 7/2012 | Mehaffy et al. |
| 2003/0021181 A1 | 1/2003 | Maguire |
| 2005/0085620 A1 | 4/2005 | Bruckmann |
| 2005/0095359 A1 | 5/2005 | Pallante et al. |
| 2005/0098579 A1* | 5/2005 | Dittmann et al. .......... 222/146.5 |
| 2005/0230423 A1* | 10/2005 | Riney et al. ............... 222/146.2 |
| 2007/0080157 A1 | 4/2007 | Mehaffy et al. |
| 2008/0217360 A1 | 9/2008 | MacLean et al. |
| 2009/0095730 A1 | 4/2009 | Ganzer et al. |
| 2009/0110813 A1 | 4/2009 | Zimmerman et al. |
| 2009/0266844 A1 | 10/2009 | McGuffey |
| 2009/0285983 A1 | 11/2009 | Baldauf et al. |
| 2009/0288403 A1 | 11/2009 | Behrens et al. |
| 2010/0089012 A1 | 4/2010 | Duckworth et al. |
| 2010/0255526 A1 | 10/2010 | Braet et al. |
| 2010/0270289 A1* | 10/2010 | Lasko ............................ 219/634 |
| 2010/0308080 A1 | 12/2010 | Rothen |
| 2011/0192866 A1 | 8/2011 | Shaw |
| 2011/0206469 A1 | 8/2011 | Furuyama et al. |
| 2012/0045352 A1 | 2/2012 | Lawyer et al. |
| 2012/0060511 A1 | 3/2012 | Zuo et al. |
| 2012/0107059 A1 | 5/2012 | Howland et al. |

FOREIGN PATENT DOCUMENTS

| | | |
|---|---|---|
| EP | 0718234 A2 | 6/1996 |
| EP | 0993873 A2 | 4/2000 |
| EP | 1772196 A1 | 4/2007 |
| JP | 60-58282 U | 4/1985 |
| JP | S63100439 A | 5/1988 |
| JP | H04500063 A | 1/1992 |
| JP | 7-289968 A | 11/1995 |
| JP | H0889872 A | 4/1996 |
| JP | 2007000837 A | 1/2007 |
| JP | 2008006361 A | 1/2008 |
| WO | 8907499 A1 | 8/1989 |
| WO | 0115836 A1 | 3/2001 |

OTHER PUBLICATIONS

The International Search Report and Written Opinion in counterpart International Application No. PCT/US2012/61964 filed Oct. 25, 2012.

International Search Report and Written Opinion from PCT Application Serial No. PCT/US2012/063913 dated Mar. 29, 2013.

The European Search Report mailed Jun. 1, 2015 for European Application No. 12843857.9.

\* cited by examiner

MELTER

BACKGROUND

The present disclosure relates generally to systems for dispensing hot melt adhesive. More particularly, the present disclosure relates to a melter for a hot melt dispensing system.

Hot melt dispensing systems are typically used in manufacturing assembly lines to automatically disperse an adhesive used in the construction of packaging materials such as boxes, cartons and the like. Hot melt dispensing systems conventionally comprise a material tank, heating elements, a pump and a dispenser. Solid polymer pellets are melted in the tank using a heating element before being supplied to the dispenser by the pump. Because the melted pellets will re-solidify into solid form if permitted to cool, the melted pellets must be maintained at temperature from the tank to the dispenser. This typically requires placement of heating elements in the tank, the pump and the dispenser, as well as heating any tubing or hoses that connect those components. Furthermore, conventional hot melt dispensing systems typically utilize tanks having large volumes so that extended periods of dispensing can occur after the pellets contained therein are melted. However, the large volume of pellets within the tank requires a lengthy period of time to completely melt, which increases start-up times for the system. For example, a typical tank includes a plurality of heating elements lining the walls of a rectangular, gravity-fed tank such that melted pellets along the walls prevents the heating elements from efficiently melting pellets in the center of the container. The extended time required to melt the pellets in these tanks increases the likelihood of "charring" or darkening of the adhesive due to prolonged heat exposure.

SUMMARY

According to the present invention, a melt system capable of heating hot melt pellets into a liquid includes a melter including a body, a chamber, a collector, channels, and a heater. The thermally conductive body forms an interior with a surface area. The chamber is at an upper end of the body for receiving the pellets. The collector is within the body and located below the chamber for receiving the liquid from the melted pellets. The channels extend between the chamber and the collector to increase the surface area of the interior, and the walls of the channels form heat exchange surfaces. The heater is for transferring heat to the body.

In another embodiment, a hot melt dispensing system includes a container, a melter, a feed system, and a dispensing system. The container is for storing hot melt pellets. The thermally conductive melter is capable of heating hot melt pellets into a liquid, and the melter defines an interior with a surface area and includes a divider located in the interior that has channels to increase the surface area of the melter. The feed system is for transporting hot melt pellets from the container to the melter. The dispensing system is for administering liquefied hot melt pellets from the melter.

In another embodiment, a method of melting hot melt pellets into a liquid includes delivering hot melt pellets into a chamber of a melter and heating the melter to liquefy the pellets into a melt liquid. In addition, the method includes flowing the melt liquid through a plurality of channels in the melter and collecting the melt liquid in a collector of the melter.

DETAILED DESCRIPTION

Figure 1:
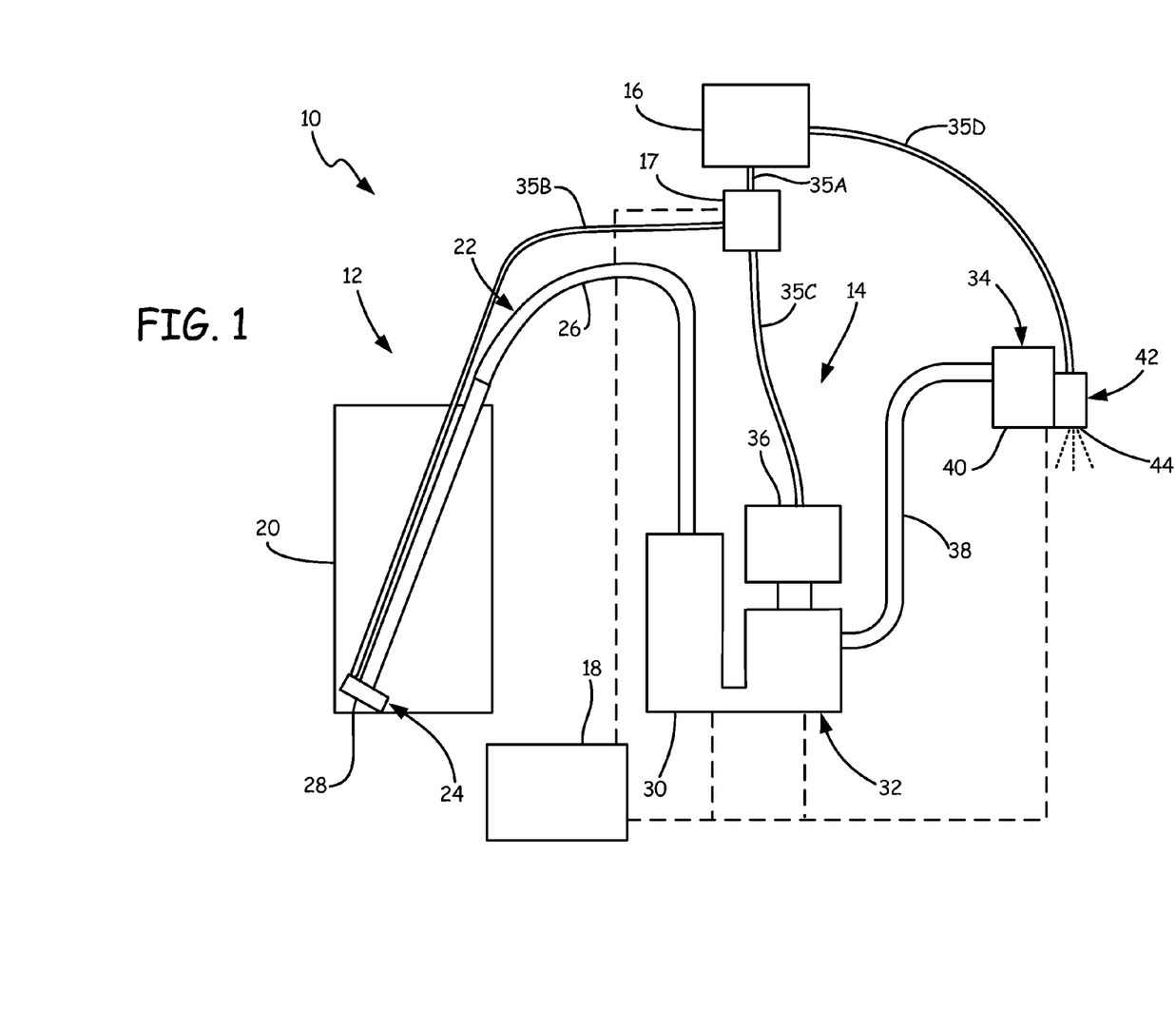
FIG. 1 is a schematic view of a system for dispensing hot melt adhesive.

FIG. 1 is a schematic view of system 10, which is a system for dispensing hot melt adhesive. System 10 includes cold section 12, hot section 14, air source 16, air control valve 17, and controller 18. In the embodiment shown in FIG. 1, cold section 12 includes container 20 and feed assembly 22, which includes vacuum assembly 24, feed hose 26, and inlet 28. In the embodiment shown in FIG. 1, hot section 14 includes melt system 30, pump 32, and dispenser 34. Air source 16 is a source of compressed air supplied to components of system 10 in both cold section 12 and hot section 14. Air control valve 17 is connected to air source 16 via air hose 35A, and selectively controls air flow from air source 16 through air hose 35B to vacuum assembly 24 and through air hose 35C to motor 36 of pump 32. Air hose 35D connects air source 16 to dispenser 34, bypassing air control valve 17. Controller 18 is connected in communication with various components of system 10, such as air control valve 17, melt system 30, pump 32, and/or dispenser 34, for controlling operation of system 10.

Components of cold section 12 can be operated at room temperature, without being heated. Container 20 can be a hopper for containing a quantity of solid adhesive pellets for use by system 10. Suitable adhesives can include, for example, a thermoplastic polymer glue such as ethylene vinyl acetate (EVA) or metallocene. Feed assembly 22 connects container 20 to hot section 14 for delivering the solid adhesive pellets from container 20 to hot section 14. Feed assembly 22 includes vacuum assembly 24 and feed hose 26. Vacuum assembly 24 is positioned in container 20. Compressed air from air source 16 and air control valve 17 is delivered to vacuum assembly 24 to create a vacuum, inducing flow of solid adhesive pellets into inlet 28 of vacuum assembly 24 and then through feed hose 26 to hot section 14. Feed hose 26 is a tube or other passage sized with a diameter substantially larger than that of the solid adhesive pellets to allow the solid adhesive pellets to flow freely through feed hose 26. Feed hose 26 connects vacuum assembly 24 to hot section 14.

Solid adhesive pellets are delivered from feed hose 26 to melt system 30. Melt system 30 can include a container and resistive heating elements for melting the solid adhesive pellets to form a hot melt adhesive in liquid form. Melt system 30 can be sized to have a relatively small adhesive volume, for example about 0.5 liters, and configured to melt solid adhesive pellets in a relatively short period of time. Pump 32 is driven by motor 36 to pump hot melt adhesive from melt system 30, through supply hose 38, to dispenser 34. Motor 36 can be an air motor driven by pulses of compressed air from air source 16 and air control valve 17. Pump 32 can be a linear displacement pump driven by motor 36. In the illustrated embodiment, dispenser 34 includes manifold 40 and dispensing module 42. Hot melt adhesive from pump 32 is received in manifold 40 and dispensed via dispensing module 42. Dispenser 34 can selectively discharge hot melt adhesive whereby the hot melt adhesive is sprayed out outlet 44 of dispensing module 42 onto an object, such as a package, a case, or another object benefiting from hot melt adhesive dispensed by system 10. Dispensing module 42 can be one of multiple modules that are part of dispenser 34. In an alternative embodiment, dispenser 34 can have a different configuration, such as a handheld gun-type dispenser. Some or all of the components in hot section 14, including melt system 30, pump 32, supply hose 38, and dispenser 34, can be heated to keep the hot melt adhesive in a liquid state throughout hot section 14 during the dispensing process.

System 10 can be part of an industrial process, for example, for packaging and sealing cardboard packages and/or cases of packages. In alternative embodiments, system 10 can be modified as necessary for a particular industrial process application. For example, in one embodiment (not shown), pump 32 can be separated from melt system 30 and instead attached to dispenser 34. Supply hose 38 can then connect melt system 30 to pump 32.

Figure 2A:
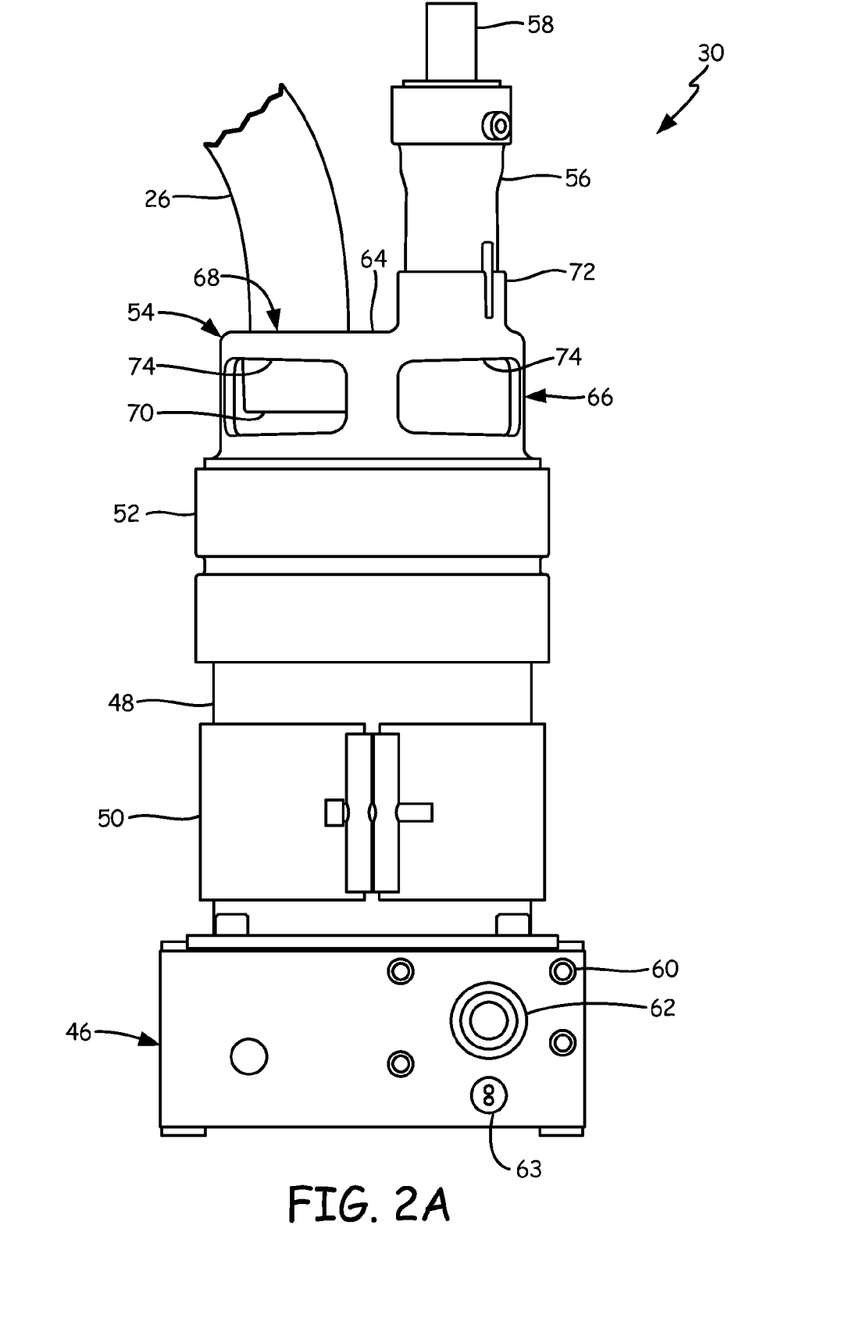
FIG. 2A is a side view of a melt system.

In FIG. 2A, a side view of melt system 30 is shown. In the illustrated embodiment, melt system 30 includes base 46, melter 48, band heater 50, thermal break 52, feed cap 54, sensor tower 56, and level sensor 58. Melter 48 is positioned on and supported by base 46. Base 46 includes bolt holes 60 for connecting base 46 to pump 32 (shown in FIG. 1). Base 46 also includes base outlet 62 to allow fluid flow from melter 48 to pump 32. Band heater 50 is attached to melter 48 for heating melter 48, and base heater 63 is attached to base 46 for heating base 46. Base heater 63 is an electrically powered resistive heating element in a rod-form, as shown later in FIG. 6. Band heater 50 is an electrically powered resistive heating element wrapped circumferentially around and in contact with melter 48 for conducting heat from band heater 50 to melter 48. Melter 48 is a container for melting adhesive pellets into a liquid state, and for holding the adhesive pellets and the hot melt adhesive in the liquid state. In the illustrated embodiment, melter 48 is substantially cylindrical. In alternative embodiments, melter 48 can have a different shape, such as oval, square, rectangular, or another shape suitable for the application. Thermal break 52 is a connector that connects feed cap 54 to melter 48. Thermal break 52 can reduce heat conduction from relatively hot melter 48 to relatively cool feed cap 54. Thermal break 52 can be made of silicone or another material having a relatively low thermal conductivity. In alternative embodiments, thermal break 52 can be omitted and feed cap 54 can be connected to melter 48 either directly or via another suitable mechanism.

Feed cap 54 is a cover for melter 48 and melt system 30, connected to a top of melter 48. In one embodiment, feed cap 54 can be made of a polymer material. In alternative embodiments, feed cap 54 cam be made of another material, such as a metal. Feed cap 54 includes cap top 64 and cap side 66. In the illustrated embodiment, cap side 66 is substantially cylindrical and cap top 64 has a substantially circular shape when viewed from above. Feed cap 54 can have a shape that is similar to that of melter 48, or can have a shape that differs from that of melter 48.

Feed inlet 68 is positioned on cap top 64 and includes inward projection 70, extending downward from cap top 64. Feed inlet 68 is a hole through cap top 64 and is connected to feed hose 26 for receiving a supply of adhesive pellets and air supplied by feed assembly 22 (shown in FIG. 1). Feed assembly 22 is a feed system for feeding the supply of adhesive pellets from container 20 (shown in FIG. 1). Feed hose 26 extends into inward projection 70 of feed inlet 68. Cap side 66 of feed cap 54 include windows 74, which allow the air carrying the adhesive pellets to be vented to the atmosphere as the pellets fall from projection 70 into melter 48.

Sensor connection 72 is positioned on cap top 64 and connects to sensor tower 56 and level sensor 58. Sensor tower 56 connects level sensor 58 to feed cap 54 such that level sensor 58 is aimed toward a top of melter 48. In the illustrated embodiment, level sensor 58 is an ultrasonic sensor for sensing a level of adhesive pellets in melter 48. In alternative embodiments, level sensor 58 can be another type of sensor that is suitable for the application, such as an optical sensor.

Figure 2B:
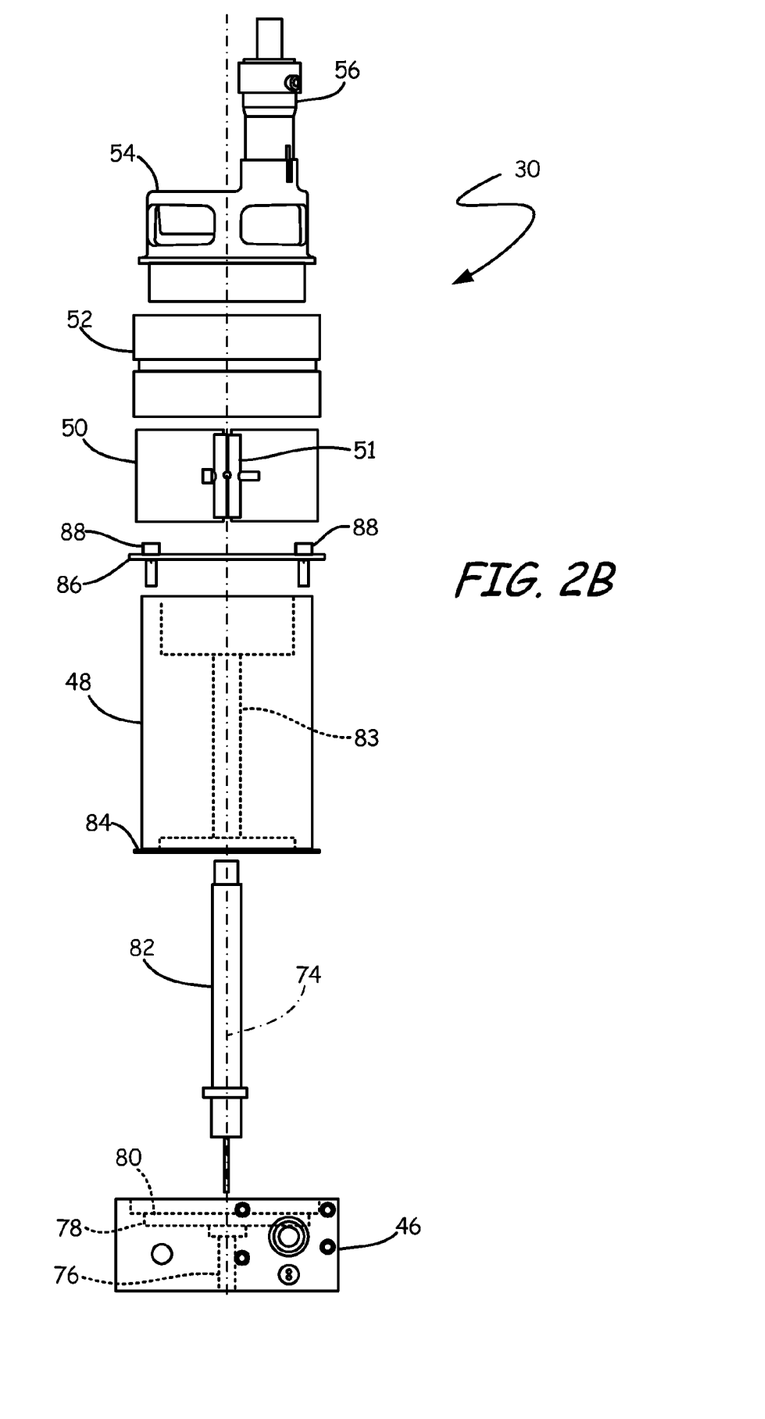
FIG. 2B is an exploded view of the melt system.

In FIG. 2B, an exploded view of melt system 30 is shown. More specifically, the components of melt system 30 have been separated along linear stacking axis 74. In general, melter 48, plate 86, and cartridge heater 82 are releasably attached to base 46; melter 48 and feed cap 54 are releasably attached to thermal break 52; and band heater 50 and cartridge heater 82 are releasably attached to melter 48. In this sense, releasably attached denotes that two or more components are attachable and detachable without permanent physical modification to any component. Two non-limiting examples of releasably attached pieces include a component being pushed into an aperture of another component by hand and a component being fastened to another component using a threaded fastener.

In the illustrated embodiment, stacking axis 74 begins at base 46 and extends upwards. Base 46 has a plurality of internal reliefs including heater bore 76, basin 78, and ledge 80. More specifically, heater bore 76 is a threaded aperture that passes through base 46 and is concentric with and extends along stacking axis 74. Above heater bore 76 is basin 78 which will be discussed further with reference to FIGS. 4-6. Above basin 78 is ledge 80, which has a shallow, disc shape that is concentric with and extends along stacking axis 74. Heater bore 76 is for attaching cartridge heater 82 within base 46. Cartridge heater 82 is an electrically powered resistive heating element in a rod-form for heating melter 48, and, more specifically, cartridge heater 82 includes an aluminum thermal housing with an electric heater cartridge inside of the housing. Ledge 80 is for locating melter 48 within base 46. Specifically, rim 84 of melter 48 interfaces with ledge 80 when melter is adjacent to base 46.

Figure 3:
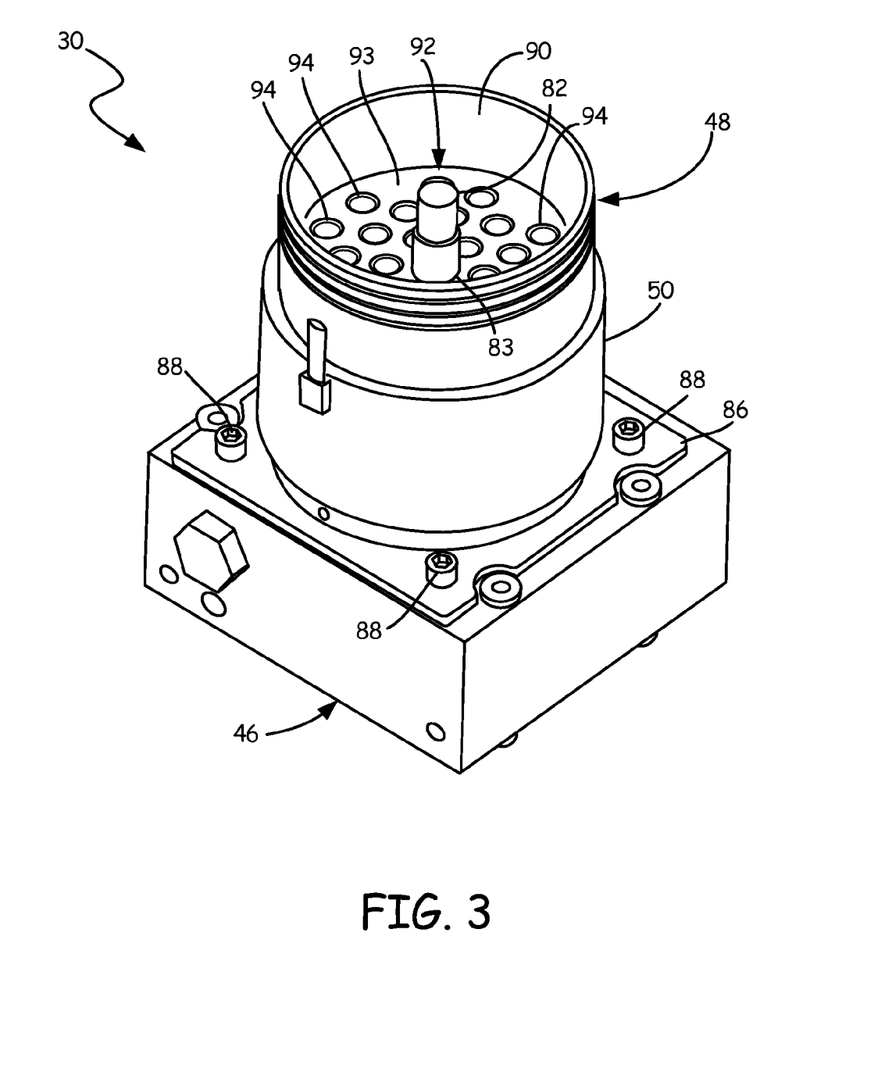
FIG. 3 is a perspective view of a partially assembled melt system including a melter.
Figure 4:
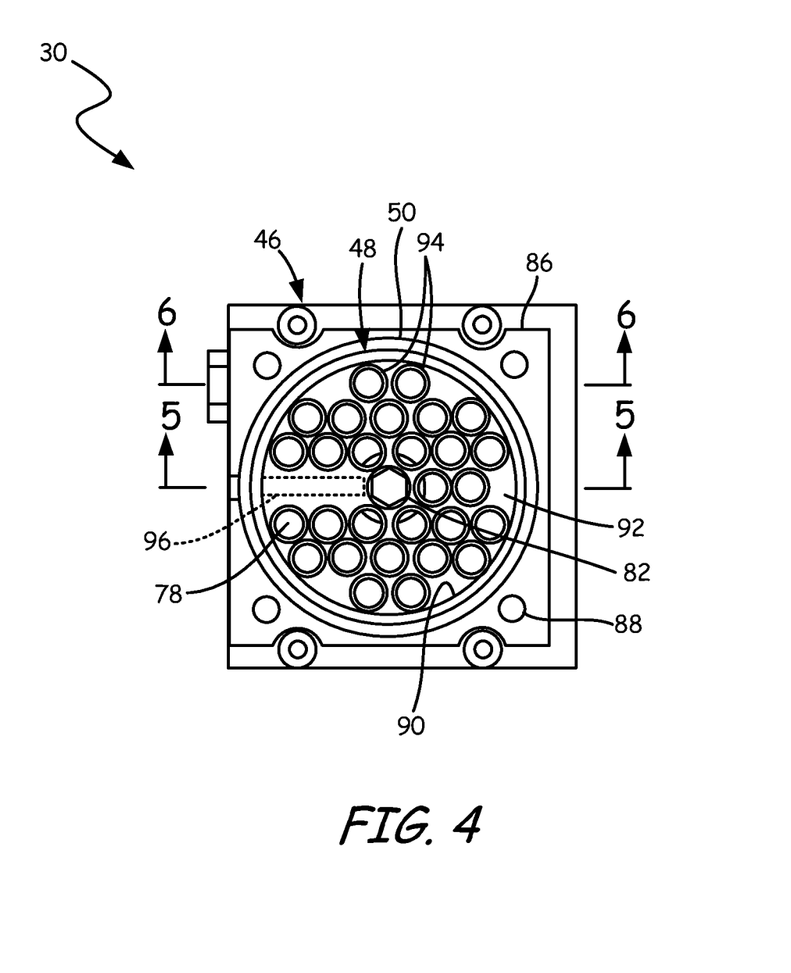
FIG. 4 is a top view of the partially assembled melt system including the melter.

To assemble the illustrated embodiment of melt system 30, cartridge heater 82 is moved toward base 46 along stacking axis 74 and is screwed into heater bore 76 until cartridge heater 82 is fully seated in base 46. Cartridge heater 82 is electrically connected to controller 18 (shown in FIG. 1) for operability purposes. Then melter 48 is moved down stacking axis 74, and cartridge heater 82 is inserted into cartridge bore 83. Melter 48 is moved further downward until rim 84 is seated in ledge 80 of base 46. Then plate 86, which has an aperture that is larger than melter 48, is placed over melter 48 and moved down stacking axis 74. Plate 86 is then fastened to base 46 with a plurality of bolts 88, capturing melter 48 between ledge 80 and plate 86. Melter 48 is held captive because the aperture in plate 86 is smaller than the outer diameter of rim 84 (as shown later in FIG. 5). Then band heater 50 is placed around melter 48, secured with latch 51, and electrically connected to controller 18 (shown in FIG. 1). If the assembly process is stopped at this point, this is the degree of assembly of melt system 30 that is shown in FIGS. 3, 4, and 6.

To complete assembly of melt system 30, thermal break 52 is placed at the top of melter 48, and moved down stacking axis 74 until it is seated. Finally feed cap 54 is moved along stacking axis 74, seating feed cap 54 within thermal break 52.

In the illustrated embodiment, the components of melt system 30 are separable along stacking axis 74. Once all of the components of melt system 30 are assembled and nested together, melt system 30 extends along and is generally concentric with stacking axis 74. This is mainly due to the generally cylindrical shape of the components (or features thereof) of melt system 30, specifically heater bore 76, ledge 80, heater cartridge 82, melter 48, band heater 50, thermal break 52, and feed cap 54.

The components and configuration of melt system 30 allow for melter 48 to be releasably attached to base 46, band heater 50, and cartridge heater 82. This permits melter 48 to be exchanged if melter 48 needs cleaning or if system 10 (shown in FIG. 1) needs to be changed to run a different adhesive material. When such an exchange of melter 48 occurs, any remaining adhesive in melter 48 can be conserved for later use. In addition, band heater 50 and cartridge heater 82 are releasably attached to base 46 and/or melter 48. This permits the replacement of band heater 50 and cartridge heater 82 in case of a failure of either of these components.

Depicted in FIG. 2B is one embodiment of the present invention, to which there are alternative embodiments. For example, not all of the components of melt system 30 need to be or have features that are concentric with stacking axis 74. For another example, melter 48 can be attached to base 46 using alternative components and features, such as an external thread on melter 48 and an internal thread in base 46. For a further example, melt system 30 can have at least two melters 48 connected to base 46, with each melter 48 having its own feed cap 54. Such a parallel arrangement of melters 48 allows for a greater output rate of adhesive material. For yet another example, melt system 30 can have at least two melters 48 stacked atop one another, with only one melter 48 being attached to base 46 and only one melter 48 being attached to feed cap 54. In such a serial arrangement, the total volume of melted adhesive material is increased, allowing for short bursts of a very high, non-sustainable output rate (provided that there is an adequate recovery time with a low output rate).

In FIG. 3, a perspective view of the partially assembled melt system 30 is shown, including melter 48. Melter 48 defines a body with an interior that includes chamber 90 at the upper end of the interior of melter 48. In the illustrated embodiment, chamber 90 is a cylindrical volume for receiving pellets (shown later in FIG. 5). Below chamber 90 is divider 92 that walls and defines a plurality of channels 94. In this embodiment, divider 92 is a solid cylindrical body that includes a plurality of circularly cylindrical channels 94. Each channel 94 is fluidly connected to chamber 90 and extends downwards through melter 48, with the height of each channel 94 being greater than the width of each channel 94. Divider 92 subdivides melter 48 to increase the ratio of surface-area-to-volume when compared to a hollow cylinder. More specifically, divider 92 as shown in FIG. 3 has a surface-area-to-volume ratio of 4.59, which is approximately five times greater than a hollow cylinder of the same size. This increased surface-area-to-volume-ratio enhances heat exchange between melter 48 and the adhesive in both the solid (pellet) and liquid states. In addition, the volume of chamber 90 is approximately the same as the volume within channels 94.

Cartridge heater 82 is in contact with melter 48 for conducting heat from cartridge heater 82 to melter 48. The heat from cartridge heater 82 on the interior of melter 48 along with the heat from band heater 50 on the exterior of melter 48 is spread throughout melter 48 because melter 48 is made from a thermally conductive material. In the illustrated embodiment, melter 48 is comprised of an aluminum alloy material. This arrangement provides for substantially homogeneous temperature throughout melter 48.

The components and configuration of melt system 30 allow for melter 48 to heat up rapidly and evenly. In the illustrated embodiment, melter 48 and any material it may contain can be heated up to a sufficient operating temperature within approximately ten minutes. In addition, this heating is accomplished without bringing band heater 50 in contact with the adhesive (shown in FIG. 5).

Depicted in FIG. 3 is one embodiment of the present invention, to which there are alternative embodiments. For example, melter 48 can be made larger or smaller. In such an embodiment the absolute size of channels 94 may not change substantially. Therefore, the relative size of channels 94 may decrease if melter 48 is enlarged, and the relative size of channels 94 may increase if melter 48 is diminished. For another example, the shape of each channel 94 may be any suitable shape other than that of a circular cylinder.

In FIG. 4, a top view of the partially assembled melt system 30 is shown, including melter 48. In the illustrated embodiment, each channel 94 runs substantially vertically, and therefore, each channel 94 is substantially parallel to the other channels 94. Directly beneath channels 94 is basin 78 (shown in FIG. 2B). Basin 78 is indirectly fluidly connected to the plurality of channels 94 (as discussed further with FIG. 5).

In the illustrated embodiment, there is a solid portion of melter 48 where there are no channels 94. Here there is a plurality of sensor ports 96 (although only one is visible in phantom in FIG. 4). Sensor ports 96 permit the measurement of the temperature of divider 92. This data can be used to approximate the temperature inside of channels 94.

Figure 5:
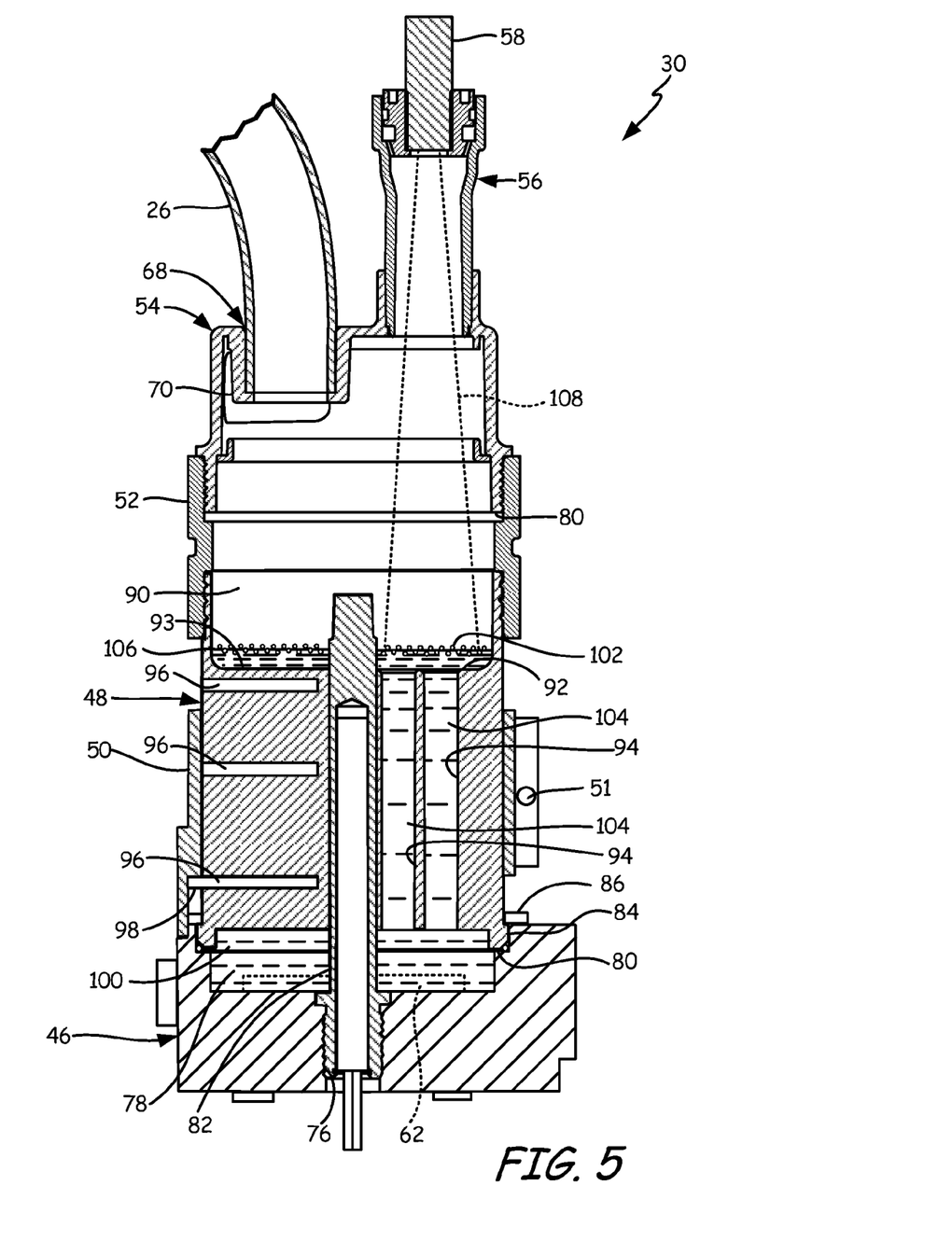
FIG. 5 is a cross section view of the melt system along line 5-5 in FIG. 4.
Figure 6:
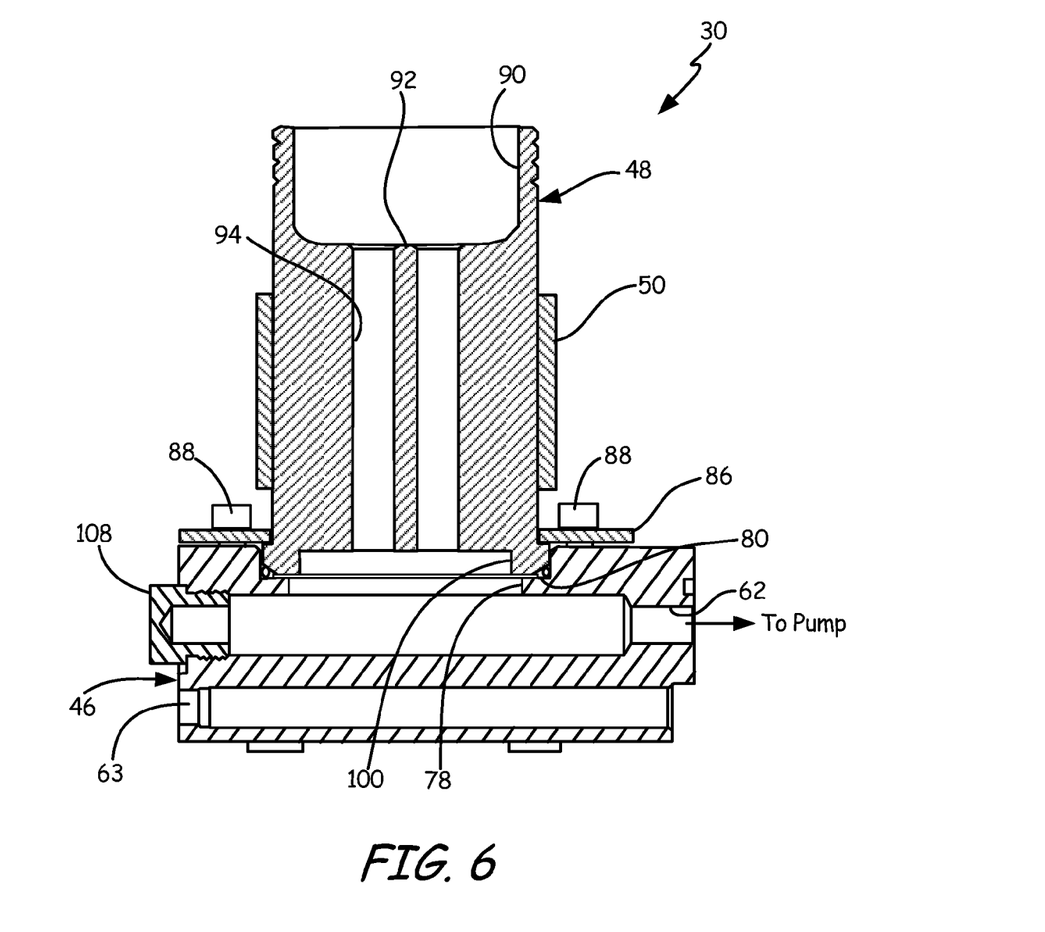
FIG. 6 is a cross section view of the melt system along line 6-6 in FIG. 4.

In FIG. 5, a cross section view of melt system 30 along line 5-5 in FIG. 4 is shown. In the illustrated embodiment, melter 48 includes three sensor ports 96. Although FIG. 4 shows only one temperature sensor 98 located in the lowermost sensor port 96, temperature sensor 98 can be placed to a different sensor port 96 as desired, or there can be additional temperature sensors 98 employed.

As stated previously, chamber 90 is located at the top of melter 48 for receiving pellets 102, and channels 94 are fluidly connected to chamber 90 and extend downward therefrom. At the bottom end of channels 94 is collector 100. In the illustrated embodiment, collector 100 is a plain cylindrical volume that is positioned for receiving melt liquid 104 from channels 94. In addition, collector 100 is a counterbore that surrounds and is coaxial with cartridge bore 83. Collector 100 is also fluidly connected to basin 78 of base 46 on the bottom side. Basin 78 is also a plain cylindrical volume, although outlet 62 is cut into the rear side of basin 78 so that basin 78 and outlet 62 are fluidly connected.

During operation of melt system 30 as part of system 10 (shown in FIG. 1), pellets 102 are transported with compressed air by feed assembly 22 (shown in FIG. 1) from container 20 (shown in FIG. 1) through feed hose 26, and through feed inlet 68 of feed cap 54. Pellets 102 fall downward into melter 48 by force of gravity, and are distributed substantially evenly in chamber 90.

Pellets 102 are then liquefied by melter 48. More specifically, melter 48 is heated by band heater 50 and heater cartridge 82 to melt pellets 102 into melt liquid 104. Melt liquid 104 has melt level 106 that is proximate to divider top 93 (and thus the top ends of channels 94. Melt liquid 104 flows from chamber 90, through channels 94, and into collector 100. From collector 100, melt liquid flows through basin 78 and into base outlet 62. Melt liquid 104 then drawn into pump 32 (shown in FIG. 1) and is pumped to dispenser 34 (shown in FIG. 1) for application, which can be, for example, for adhering packages, cases, or other objects.

In the illustrated embodiment, sensor beam 108 extends from level sensor 58 toward melt level 106 in chamber 90. In embodiments where level sensor 58 is an ultrasonic sensor, sensor beam 108 is a beam of ultrasonic pulses. The time to travel from level sensor 58 to melt level 106 and back to level sensor 58 is an indication of the distance between level sensor 58 (whose position is known) and melt level 106. Level sensor 58 sends level data to controller 18, and the data can then be used to determine whether melt system 30 has a sufficient quantity of melt liquid 104 or whether additional pellets 102 should be added.

During operation of melt system 30, when compared to the length of divider 92, melt level 106 is maintained within a range that is no more than twenty-five percent of the height of divider 92. In the illustrated embodiment, divider 92 is 10.2 cm (4 inches) tall, so melt level 106 is maintained within a 2.54 cm (1 inch) range that begins 0.635 cm (0.25 inches) above divider top 93 at its lowest point. In addition, this range is more than 0.635 cm (0.25 inches) from the upper end of divider 92, so although the volume ratio of chamber 90 to divider 92 is approximately 1:1, all of the volume of chamber 90 is not utilized during normal operation of melt system 30.

When system 10 (shown in FIG. 1) is shut down, melt system 30 is also turned off. More specifically, band heater 50 and cartridge heater 82 are no longer supplied with electricity. As melt system 30 cools down to ambient temperature, melt liquid 104 solidifies in melter 48 and base 46. Melter 48 can then be exchanged for a different melter 48. This would be desirable, for example, if a different material is going to be used the next time that system 10 is operated. Otherwise, the material solidified around melter 48 would need to be melted and purged through outlet 44 (shown in FIG. 1).

If melter 48 is not exchanged, then the material solidified around melter 48 is melted by the heat provided to melter 48 by band heater 50 and cartridge heater 82. Because of the high surface-area-to-volume ratio of divider 92, the material in channels 94 melts rapidly. In the illustrated embodiment, the time from cold start-up to full function is as short as ten minutes. In addition, melter 48 can melt a large number of pellets 102 due to the rapid heat transfer between heaters 50, 82 and melt liquid 104.

In FIG. 6, a cross section view of melt system 30 along line 6-6 in FIG. 4 is shown. As stated previously, base outlet 62 is fluidly connected with basin 78. In the illustrated embodiment, base outlet 62 has a generally cylindrical shape and is fluidly connected with pump 32 (shown in FIG. 1) at one end. At the other end of base outlet 62 is plug 108. Beneath base outlet 62 is base heater 63. Base heater 63 extends substantially along the entire length of base outlet 62. This allows for solidified material in base 46 to be heated during start-up and operation of melt system 30.

Figure 7:
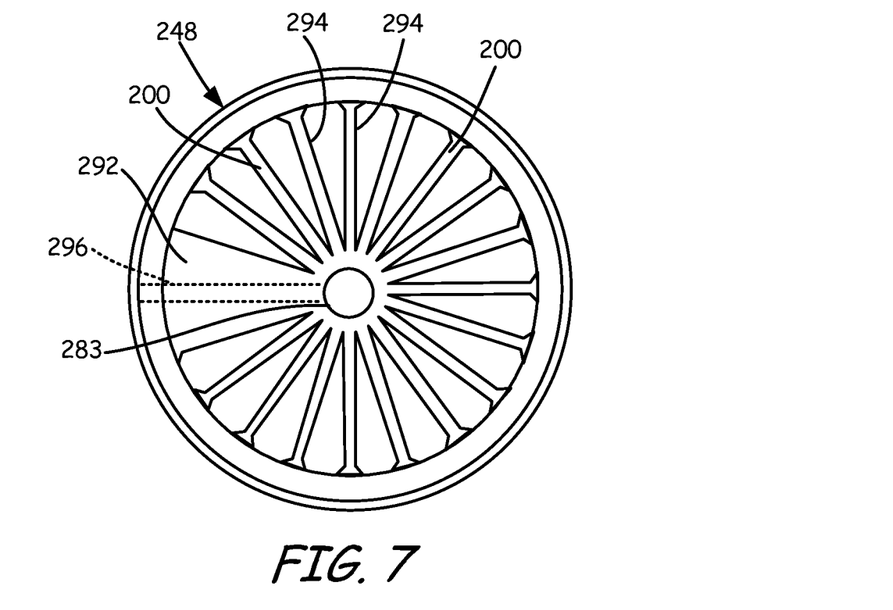
FIG. 7 is a top view of an alternate embodiment melter.
Figure 8:
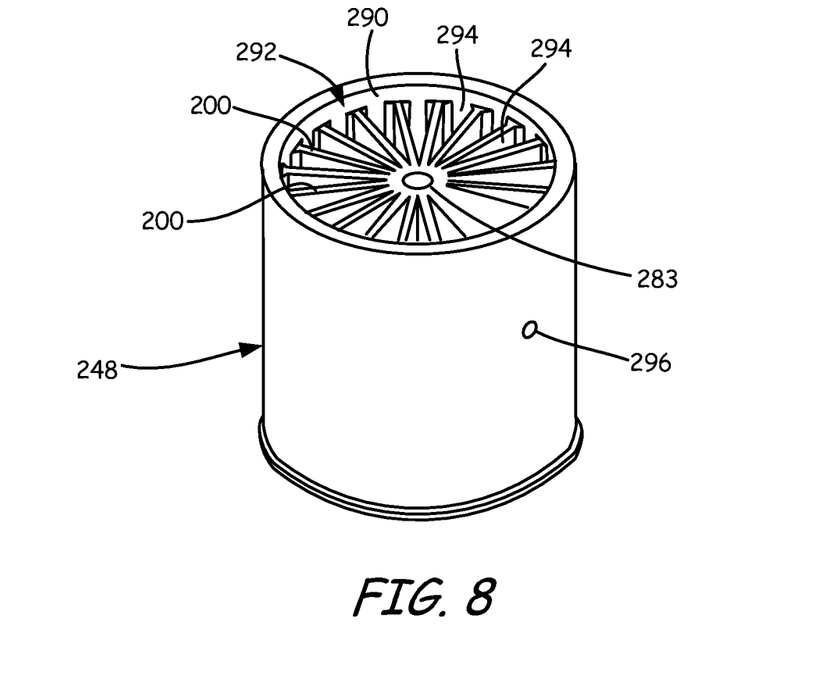
FIG. 8 is a perspective view of the alternate embodiment melter.

In FIG. 7, a top view of alternate embodiment melter 248 is shown. In FIG. 8, a perspective view of alternate embodiment melter is shown. FIGS. 7-8 will now be discussed simultaneously. Elements of alternate embodiment melter 248 that are similar in function to that of melter 48 (shown in FIGS. 3-4) have the same two-digit number with two hundred added to each of them.

In the illustrated embodiment, melter 248 is a cylindrical body that defines an interior including chamber 290 at the upper end of the interior of melter 248. In the illustrated embodiment, chamber 290 is a plain cylindrical volume for receiving pellets (shown in FIG. 5). Below chamber 290 is divider 292. Divider 292 is comprised of a plurality of spokes 200 that define a plurality of wedge-shaped channels 294, with each channel 294 being fluidly connected to chamber 290 and extending downwards substantially parallel to the other channels 294. Channels 294 extend all the way through divider 292 to the bottom of melter 248. Divider 292 subdivides melter 248 to increase the ratio of surface-area-to-volume when compared to a plain cylinder. More specifically, divider 292 as shown in FIGS. 7-8 increases the surface-area-to-volume ratio by approximately ten times. In addition, in the illustrated embodiment, spokes 200 are no thicker than 1.27 cm (0.50 inches) wide.

Divider 292 also includes cartridge bore 283 that extends downward through melter 248 such that cartridge heater 82 (shown in FIG. 3) can be inserted into melter 248. In addition, melter 248 includes sensor port 296 such that temperature sensor 98 (shown in FIG. 5) can be inserted into melter 248.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A melt system capable of heating hot melt pellets into a liquid, the melt system comprising:
   a melter comprising:
      a thermally conductive body forming an interior with a surface area;
      a chamber at an upper end of the body for receiving the pellets;
      a collector within the body and located below the chamber for receiving the liquid from the melted pellets;
      a thermally conductive divider between the chamber and the collector, the divider defining a plurality of channels that extend between the chamber and the collector, wherein a plurality of walls of the plurality of channels form heat exchange surfaces wherein the divider has a surface-area-to-volume ratio that is greater than 4; and
      a first heater for transferring heat to the body, the first heater being positioned around the plurality of channels;
   a controller that causes the feed system to replenish the pellets in the melter; and
   a level sensor connected to the controller, the level sensor being configured to determine the melt level and send melt level data to the controller.

2. The melt system of claim 1, wherein the plurality of channels extends substantially vertically.

3. The melt system of claim 1, wherein the first heater located on an exterior of the body.

4. The melt system of claim 1, wherein the first heater is located on an exterior of the body, and the melt system further comprising:
   a second heater located on the interior of the body.

5. The melt system of claim 1, and further comprising:
   a base beneath the melter, the base including a basin that is fluidly connected to the collector and a base outlet that is fluidly connected to the basin.

6. A hot melt dispensing system comprising:
   a container for storing hot melt pellets;

a thermally conductive melter capable of heating hot melt pellets into a liquid, the melter defining an interior and including:
  a divider located in the interior that has a plurality of channels defined by walls that act as heat exchange surfaces of the melter, wherein the divider has a surface-area-to-volume ratio that is greater than 4; and
  a first heater positioned around the melter for transferring heat to the plurality of channels;
a feed system for transporting hot melt pellets from the container to the melter;
a dispensing system for administering liquefied hot melt pellets from the melter;
a controller that causes the feed system to replenish the pellets in the melter; and
a level sensor connected to the controller, the level sensor being configured to determine the melt level and send melt level data to the controller.

7. The hot melt dispensing system of claim 6, wherein the melter further comprises:
  a chamber for receiving the pellets above the divider and fluidly connected to the plurality of channels; and
  a collector below of and fluidly connected to the plurality of channels.

8. The hot melt dispensing system of claim 6, wherein the plurality of channels extends substantially vertically.

9. The hot melt dispensing system of claim 6, wherein the first heater is located on an exterior of the melter for transferring heat to the melter.

10. The hot melt dispensing system of claim 6, and further comprising:
  a second heater located on the interior of the melter for transferring heat to the melter.

11. The melt system of claim 1, wherein a first volume of the chamber is approximately the same as a second volume of the plurality of channels.

12. The hot melt dispensing system of claim 6, and further comprising:
  a chamber at an upper end of the body for receiving the hot melt pellets;
  wherein a first volume of the chamber is approximately the same as a second volume of the plurality of channels.

13. The melt system of claim 3, wherein the first heater is secured around the body with a latch.

14. The hot melt dispensing system of claim 9, wherein the first heater is secured on the exterior of the melter with a latch.

15. The melt system of claim 1, wherein the divider has a surface-area-to-volume ratio of 4.59.

16. The melt system of claim 1, and further comprising:
  a base having disc-shaped ledge;
  wherein the body has a rim below the divider; and
  wherein the rim contacts the ledge to attach the melter to the base.

17. The melt system of claim 4, wherein the second heater is concentric with the first heater.

18. The melt system of claim 10, wherein the second heater is concentric with the first heater.

19. The melt system of claim 4, wherein the second heater extends through the first heater.

20. The melt system of claim 10, wherein the second heater extends through the first heater.

21. A hot melt dispensing system comprising:
  a container for storing hot melt pellets;
  a thermally conductive melter capable of heating hot melt pellets into a liquid, the melter defining an interior and including:
    a divider located in the interior that has a plurality of channels defined by walls that act as heat exchange surfaces of the melter, wherein an upper surface of the melt liquid in the melter represents a melt level of melt liquid in the melter; and
    a first heater positioned around the melter for transferring heat to the plurality of channels;
  a feed system for transporting hot melt pellets from the container to the melter;
  a dispensing system for administering the melt liquid from the melter; and
  a controller that causes the feed system to replenish the pellets in the melter to maintain the melt level to within twenty-five percent of a length of the divider from a top end of the plurality of channels.

22. The hot melt dispensing system of claim 21, and further comprising:
  a level sensor connected to the controller, the level sensor being capable of determining the melt level and sending melt level data to the controller.

* * * * *